United States Patent [19]

Holzhauer et al.

[11] Patent Number: 4,876,386

[45] Date of Patent: Oct. 24, 1989

[54] PROCESS FOR THE OXIDATION OF DI- OR TRIMETHYLBENZENES IN THE PRESENCE OF COBALT AND MANGANESE FROM OXIDATION RESIDUE INCINERATOR ASH

[75] Inventors: Juergen K. Holzhauer, Naperville; Dennis J. Michalak, Warrenville; Wayne P. Schammel, Naperville, all of Ill.

[73] Assignee: Amoco Corporation, Chicago, Ill.

[21] Appl. No.: 199,022

[22] Filed: May 26, 1988

Related U.S. Application Data

[63] Continuation-in-part of Ser. No. 62,965, Jun. 17, 1987, Pat. No. 4,786,621.

[51] Int. Cl.$^4$ .............................................. C07C 51/265
[52] U.S. Cl. ...................................... 562/414; 502/28; 562/416
[58] Field of Search ........................... 562/414; 502/28

[56] References Cited

U.S. PATENT DOCUMENTS 4,546,202 10/1985 Edwards et al. ................... 562/414

Primary Examiner—Werren B. Lone
Assistant Examiner—Vera C. Clarke
Attorney, Agent, or Firm—Gunar J. Blumberg; William N. Magidson; Ralph C. Medhurst

[57] ABSTRACT

A process is disclosed for the oxidation of di- or trimethyl benzenes with molecular oxygen under liquid-phase conditions in the presence of a recovered cobalt and manganese catalyst, which has been recovered by heating oxidation incinerator ash in the presence of acetic acid and a reducing agent wherein the weight ratio of acetic acid to said oxidation incinerator ash is from about 1:1 to about 50:1, and the ratio of electrons which the reducing agent can deliver to atoms of the cobalt plus manganese in the oxidation incinerator ash is from about 0.1:1 to about 4:1 at about the boiling point of the acetic acid at atmospheric pressure and recovering the cobalt and manganese in liquid solution as the metal acetic acid salt, wherein the oxidation is carried out at a temperature of from about 100° C. to about 250° C.

19 Claims, No Drawings

PROCESS FOR THE OXIDATION OF DI- OR TRIMETHYLBENZENES IN THE PRESENCE OF COBALT AND MANGANESE FROM OXIDATION RESIDUE INCINERATOR ASH

CROSS-REFERENCE TO RELATED APPLICATION

This is a continuation-in-part application of Ser. No. 62,965 filed June 17, 1987, now U.S. Pat. No. 4,786,621.

FIELD OF THE INVENTION

The field of this invention relates to the recovery of cobalt, manganese and other metals in the form of their acetate salts directly from mixed metal oxides in incinerator ash for recycle as catalyst components in an oxidation process.

BACKGROUND OF THE INVENTION

In the commercial manufacture of benzene di- or tricarboxylic acids (e.g., isophthalic acid [IPA], terephthalic acid [TA] or trimellitic acid [TMLA]), a residue is obtained (after maximizing recovery of such acid and recovery for reuse of the reaction solvent), which is a mixture of oxygen-containing derivatives of benzene and toluene which are mono-, di- and tricarboxylic acids, aldehydocarboxylic acids, and methylol-substituted benzene or toluene or their carboxylic (benzoic or toluic) acids and which also contains components of catalysis. Usually such components of catalysis are Co-Mn-Br, Co-Zr-Mn-Br or Co-Zr-Mn-Ce-Br from liquid-phase oxidation of a xylene or pseudocumene (1,2,4-trimethylbenzene) with air in the presence of acetic acid reaction solvent. A similar residue is also obtained from the neat oxidation of liquid o-xylene with air in the presence of Co-Mn-Br catalyst system after dehydrating the o-phthalic acid formed to its anhydride under conditions which vaporize the anhydride, water and materials boiling between the anhydride and water. While such residues amount to from 2 to 25 weight percent of the benzene di- or tricarboxylic acid produced, such residue production annually is substantial in view of the millions of kilograms of the benzene di- or tricarboxylic acids produced annually.

Such residues contain water-soluble benzene carboxylic acids and water-soluble forms of the components of catalysis. Landfill disposal of such residues is undesirable because rain and groundwater leach out those carboxylic acids and soluble forms of the components of catalysis and can contaminate surface run-off water and eventually streams as well as below-surface aquifers. Disposal of the organic residues an be made by the processes as disclosed in U.S. Pat. Nos. 4,258,227, 4,266,084 and 4,393,264 which are incorporated into this application and made part hereof. The catalyst components in the aforementioned U.S. patents are converted to forms in the resultant ash which are difficult and/or expensive to convert to reusable forms for the oxidation of the methyl-substituted benzenes. Although, in such residues, the substituted benzene and toluene compounds, whose substiuents are the carboxy-, aldehyde- and methylol substituents, are individually desirable and useful commercial products, it is not economically feasible to separate and recover the individual compounds from the residues.

Cobalt and manganese acetates are major components of the catalyst system used for oxidizing p-xylene, m-xylene and pseudocumene. These catalyst metals are present in the oxidation residues produced by the various oxidation processes. The recovery of cobalt and manganese from the oxidation residues would not only reduce catalyst costs but also reduce disposal problems associated with disposal of the oxidation residues.

As an example, trimellitic anhydride (TMA) can be prepared by oxidation of pseudocumene in the presence of a catalyst comprising cobalt, manganese and bromine. Cobalt is an especially valuable metal and its cost is a substantial portion of the cost of the oxidation process. Fresh catalyst is necessary in the process because the oxidation is product-inhibited and difficult to complete. Mother liquor recycle containing catalyst components is not feasible because many by-product compounds which would act as inhibitors of the process would also be recycled. Although the catalyst components in the oxidation residue can be water-extracted, aqueous extraction cannot be used because trimellitic acid is very soluble in water.

Oxidation residue from p-xylene, m-xylene or pseudocumene oxidations containing cobalt and manganese catalyst metals can be disposed of by incineration or by other processes disclosed in the aforementioned three U.S. patents. A complex incineration residue of mixed metal oxide ash of cobalt and manganese is produced by the incineration of this oxidation residue. The mixed metal oxide ash from incineration is recovered in the form of clinkers and fly ash. The fly ash is collected in the electrostatic precipitator or bag filler of the residue incinerator. A cobalt and manganese aliphatic carboxylic acid solution can be obtained directly from this complex incinerator residue by contacting it with the aliphatic acid at elevated temperatures and pressures. Other processes use strong acids, such as hydrochloric acid, hydrobromic acid, sulfuric acid or nitric acid, to recover the metals from the complex incinerator residue but further processing is required to obtain cobalt and manganese acetate from these strong acid solutions.

Methods of recovering cobalt compounds are known. For example, G.B. Pat. No. 262,075 and U.S. Pat. No. 1,637,281 teach the recovery of cobalt as cobaltous acetate from cobaltic hydroxide, obtained during refining of cobalt from cobalt-containing ores, by heating cobaltic hydroxide with acetic acid in a closed vessel and in the presence of a reducing agent to a temperature above the boiling point of the acetic acid. Preferably the reducing agent is metallic cobalt in the form of a fine powder. The increasing pressure caused by use of the closed vessel causes the hydroxide to solubilize rapidly at a pressure of about 2.5 to 3.25 atmospheres. The amount of cobalt metal added forms cobaltous oxide from the cobaltic hydroxide and is approximately that which is theoretically required to convert all the cobalt to cobaltous acetate. The products of the reaction accordingly are a mixture of cobaltous oxide and cobaltous acetate.

Several methods are known for recovering cobalt-manganese oxidation catalysts. U.S. Pat. No. 2,964,559 teaches the recovery and recycle of oxidation catalysts employed for the liquid-phase oxidation catalysts employed for the liquid-phase oxidation with molecular oxygen of aliphatic substituted aromatic compounds to aromatic acids by extraction of the heavy metal catalyst from the bottoms fraction remaining after distillation of the reaction mixture. Extraction is with water or a lower-saturated monocarboxylic acid. The extract can then be recycled. Nickel, iron and chromium, present as a result of corrosion, are also extracted. However, as is taught in U.S. Pat. No. 3,341,470, the presence of iron, chromium and copper, among other heavy metals, are antagonistic when present as minor contaminants in oxidation processes using the combination of cobalt and manganese. U.S. Pat. 3,341,470 teaches the cobalt-manganese oxidation catalyst can be recovered in a contaminant free form by dissolving the incinerated oxides in sulfuric acid containing chlorides to reduce the manganese to a soluble divalent form, followed by neutralization with calcium hydroxide and buffering with calcium carbonate to precipitate iron and chromium oxides. The cobalt and manganese are precipitated as carbonates by addition of sodium carbonate and then treated with acetic acid to obtain the desired acetate. Copper can be removed with a soluble sulfide, as hydrogen sulfide. U.S. Pat. No. 4,417,972 teaches the recovery of metal catalysts from carbonaceous material and ash by oxidation in a combustion zone to oxides. The oxidized solids are then treated with an aqueous solution of a basic metal salt to extract the oxides as soluble alkali metal salts which can then be recycled to the reaction. U.S. Pat. No. 4,546,202 teaches a process for recovery of cobalt and manganese from solid aromatic acid oxidation incinerator ash, pyrolysis sand or pyrolysis char by heating the residue at a temperature of about 120° C. to about 300° C. and a pressure of about 3 atmospheres to about 30 atmospheres in the presence of acetic acid. Water can be added after the reaction to solubilize all the recoverable metal acetates. Extraction of incinerator ash comprising fly ash was less efficient because the fly ash contained oxides which were more difficult to extract.

Accordingly, a number of processes are known for recovery of metal catalysts from oxidation residues. However, known processes require process conditions which necessitate corrosion-resistant equipment, or pressure equipment, or combinations of corrosion-resistant equipment with high pressure equipment and high temperatures and additional processing after recovery of the metal components in a form suitable for recycling to the oxidation reaction. For example, strong mineral acids, such as hydrochloric acid, hydrobromic acid, sulfuric acid and nitric acid, which will react with the metal in the ash, are used. Depending on the acid used, halogens, $SO_x$ or $NO_x$ are released into the vent gas and scrubbers must be employed to remove these materials from this stream. Also, special equipment, such as glass-lined vessels and piping, is required to handle these strong mineral acids. Once the cobalt and manganese are reacted, further processing must take place to convert the cobalt and manganese ions into the acetate salts.

In our novel process, acetic acid at about the boiling point or near reflux temperature (108° C.) and atmospheric pressure is used to extract the cobalt and manganese from incinerator ash comprising fly ash and clinkers by solubilizing the cobalt and manganese directly in the form of the acetate salts. Special glass-lined or titanium equipment is not required to handle this processing, and since only water and nitrogen are produced as by-products, special scrubbers are not required.

Accordingly, our novel process avoids not only high pressure titanium equipment but permits the use of cobalt metal or other suitable reducing agents, such as hydrazine, which are particularly economical or particularly effective in recovery of the catalyst metals.

SUMMARY OF THE INVENTION

We have discovered a process for the oxidation of di- or trimethylbenzenes with molecular oxygen under liquidphase conditions in the presence of a recovered and recycled cobalt and manganese catalyst, which has been recovered by heating oxidation incinerator ash in the presence of acetic acid and a reducing agent wherein the weight ratio of acetic acid to said oxidation incinerator ash is from about 1:1 to about 50:1, and the ratio of electrons which the reducing agent can deliver to atoms of the cobalt plus manganese in the oxidation incinerator ash is from about 0.1:1 to about 4:1 at about the boiling point of the acetic acid at atmospheric pressure and recovering the cobalt and manganese in liquid solution as the metal acetic acid salt, wherein the oxidation is carried out at a temperature of from about 100° C. to about 250° C.

DETAILED DESCRIPTION OF THE INVENTION

Our process is useful in recovering cobalt and manganese from the residue from a incinerator unit comprising fly ash and clinkers. This process is inexpensive as it can be carried out in any nonpressurized vessel made of, for example, stainless steel or reinforced plastic, and does not require glass-lined vessels or special effluent gas scrubbers. The preferred aliphatic carboxylic acid is acetic acid.

The residue from p-xylene, m-xylene or pseudocumene oxidations, using cobalt and manganese as part of the catalyst system, is burned in an incinerator producing mainly mixed oxides of cobalt and manganese in the form of fly ash and clinkers. The fly ash is usually collected in an electrostatic precipitator or bag filter. The clinkers are removed periodically from the incinerator interior as hard deposits which require grinding before further processing. The incinerator ash is combined with glacial acetic acid or mixtures of acetic acid and water and a suitable reducing agent. Suitable reducing agents include cobalt metal in a finely divided state and hydrazine.

In the manufacture by oxidation to prepare isophthalic acid (IPA), terephthalic acid (TA) or trimellitic acid (TMA), the catalyst components are usually cobalt, manganese and bromine, or cobalt, zirconium, manganese and bromine, or cobalt, zirconium, cesium, manganese and bromine in a definite relationship in the catalytic mixture. Incineration residue TMA fly ash as recovered initially contains large amounts of sodium and bromine. Sodium reduces the selectivity of the oxidation process. The bromine concentration in the initial catalyst must be controlled since bromine is added during the oxidation process. Thus, to utilize the recovered cobalt and manganese from the oxidation residue incinerator ash as an oxidation catalyst to prepare TA or TMA by oxidation of benzene di- or tricarboxylic acids, the sodium and bromine components present in the recovered catalyst must be removed. Water washing of the oxidation residue incinerator ash is required before extraction of the cobalt and manganese. The washing removes the bulk of the sodium and bromine from the ash. Washing is with a large excess of water.

In the recovery of cobalt and manganese, the washed ash is combined with glacial acetic acid or a mixture of acetic acid and water and heated to reflux temperature in the presence of a reducing agent such as cobalt or manganese. The acetic acid can contain 0 to 50 (wt.) % water but 5 to 20 (wt.) % water is preferred. The ratio of acetic acid to incinerator ash can vary from 1:1 to 50:1, with 2.5:1 to 20:1 being the preferred range.

X-ray diffraction analysis of TMA fly ash indicates that the material is a mixture of cobalt oxide, CoO, and manganese cobalt oxide, $MnCo_2O_4$, present in a state of from medium to high crystallinity wherein the CoO is tied up in the crystal in some way that affects solubility. TA fly ash is believed similar.

TMA fly ash and TA fly ash are almost insoluble in acetic acid at reflux temperature. Solubility of cobalt metal alone in acetic acid is very limited also at reflux temperature. Surprisingly, when TMA fly ash and TA fly ash are refluxed with cobalt metal or hydrazine in acetic acid, the metals in the fly ash are extracted, almost quantitatively from TMA fly ash and significantly from TA fly ash.

The reducing agents solubilize the cobalt and manganese by donating electrons to reduce the insoluble higher oxides of cobalt and manganese to the soluble +2 state. A molecule of hydrazine is capable of donating four electrons according to the equation: $N_2H_4 \rightarrow N_2 + 4H^+ + 4e^-$. An atom of metallic cobalt is capable of donating two electrons according to the equation: $Co \rightarrow Co^{++} + 2e^-$.

Addition of cobalt metal to the TMA or TA fly ash in acetic acid is within the range of from about 0.05 g to about 2 g-atoms cobalt metal per g-atoms cobalt plus manganese in the ash, with a preferred range of about 0.1 to 1 g-atoms cobalt metal to g-atoms of cobalt plus manganese in the ash. Below the range, the ash is incompletely extracted. Above the preferred range, the cobalt metal is incompletely dissolved. Cobalt metal is a particularly attractive reducing agent from an economic standpoint since it becomes a catalyst component and thus there is no net cost to the process.

Maximum addition of hydrazine to the TMA or TA fly ash in acetic acid is limited only by economics. Extraction efficiency of cobalt and manganese from TMA fly ash increases sharply from an initial amount of zero hydrazine present until about 0.1 moles hydrazine per g-atom cobalt plus manganese in the ash where the increase becomes gradual. Due to economic considerations, a range of about 0.05 to about 0.5 moles hydrazine per g-atom cobalt plus manganese in the ash is preferred. The hydrazine used is a hydrazine solution in water, in a wide range of hydrazine concentration, preferably an 85% hydrazine hydrate in water, corresponding to a 54.4 percent solution, although as little as a 10% hydrazine solution in water can be used.

The period of reflux can be within the range of from 0 minutes to about 120 minutes. At zero reflux time, extraction efficiency is decreased although good extraction efficiencies can be obtained. Preferably the reflux period is about 60 minutes or less.

If large amounts of corrosion metals such as iron are present in the extracted solution, the pH of the solution can be adjusted to above 3.0 to cause the iron to precipitate. If the TMA fly ash or TA fly ash contains large scale-like particles of a ferromagnetic material from the incinerator or oxidation reactor, these pieces can be removed by suitable means, such as magnetic separation prior to the extraction process.

Among the reducing agents tested, cobalt metal and hydrazine were the most effective solubilizing agents. In the absence of any solubilizing agent, using acetic acid alone, only a small portion of TMA fly ash, about 7%, was extracted. Acetaldehyde, formic acid, and formaldehyde gave little or no improvement over the base case using only acetic acid. Hydrobromic acid was an effective solubilizing agent of TMA fly ash but the ratio of bromine to metals in the recovered cobalt and manganese salts was unacceptable. Nitric acid and sulfuric acid were ineffective. Extraction efficiencies with hydrogen peroxide as solubilizing agent were unacceptable, being as low as 13% of metals present in comparison tests with cobalt and hydrazine solubilizing agents. Extraction efficiency with hydroxylamine hydrochloride as a solubilizing agent was acceptable but residual chloride was unacceptable. Sodium formaldehyde sulfoxylate was also effective as a solubilizing agent but a residue of sulfur compounds was objectionable.

Accordingly, the instant invention comprises a process for the recovery of cobalt and manganese from aromatic acid oxidation incinerator ash which process comprises heating said oxidation incinerator ash in the presence of acetic acid and a reducing agent wherein the weight ratio of acetic acid to said oxidation incinerator ash is from about 1:1 to about 50:1, and the ratio of electrons which said reducing agent can deliver to atoms of said cobalt plus manganese in said oxidation incinerator ash is from 0.1:1 to 4:1, preferably from about 0.2:1 to about 2:1, at about the boiling point of said acetic acid at atmospheric pressure and recovering said cobalt and manganese in liquid solution as the metal acetic acid salt.

Preferably, the instant invention comprises a process for the recovery of cobalt and manganese from aromatic acid oxidation incinerator ash comprising fly ash and clinkers which process comprises heating said oxidation incinerator ash in the presence of acetic acid and a reducing agent preferably cobalt metal or hydrazine wherein the weight ratio of acetic acid to said oxidation incinerator ash is from about 2.5:1 to about 20:1, the ratio of gram-atoms of cobalt metal to gram-atoms cobalt plus manganese in said ash is from about 0.05:1 to about 2:1, more preferably from about 0.1:1 to about 1:1, or the ratio of moles of hydrazine to gram-atoms of cobalt plus manganese in said ash is from about 0.025:1 to about 1:1, more preferably from about 0.05:1 to about 0.5:1, at a temperature of approximately reflux temperature or boiling point of acetic acid at atmospheric pressure, and recovering said cobalt and manganese in liquid solution as the metal acetic acid salt.

The instant invention also comprises a process for the oxidation of di- or trimethylbenzenes with molecular oxygen under liquid-phase conditions in the presence of a recovered and recycled cobalt and manganese catalyst, which has been recovered according to the above process, wherein said oxidation is carried out at a temperature of from about 100° C. to about 250° C.

The following examples are being presented to facilitate the understanding of the present invention. It is to be understood that these examples are presented for the purpose of illustration only and are not intended to limit the scope of the invention.

EXAMPLE I

Fly ash was collected from the incineration of product distillation residue from the manufacture of trimellitic anhydride (TMA). A sample of the TMA incinerator fly ash was washed with a large excess of water and dried. This procedure removed substantially all soluble materials such as sodium and bromine. The washed ash contained about 58.0 percent cobalt, 15.8 percent manganese, and 2.39 percent zirconium. A flask equipped with heating mantle, magnetic stirrer, and reflux condenser was charged with 26 g of washed ash, 247 g of acetic acid, and 13 g of water. The mixture was heated to reflux (ca. 107° C.), and 34.5 g of a mixture containing 10 percent hydrazine and 90 percent water was added over 30 minutes. This mixture was kept at reflux for an additional two hours and filtered. An additional 130 g of 95 percent acetic acid was used to rinse out the flask and wash the filter cake. The cake was dried overnight at 100° C. By comparison of the weight of the residue with that of the starting material, it was found that 93.5 percent of the ash had been extracted.

EXAMPLE II

The procedure of Example I was followed, except that the temperature was kept at 70° C. 76.1 percent of the ash was extracted.

EXAMPLE III

The procedure of Example I was followed, except that the temperature was kept at 70° C., and 69 g of 10 percent hydrazine was used. 86.5 percent of the ash was extracted.

EXAMPLE IV

The procedure of Example I was followed, except that there was no hold time after hydrazine addition. 86.5 percent of the ash was extracted.

EXAMPLE V

The procedure of Example I was followed, except that 17.25 g of 10 percent hydrazine was used. 88.8 percent of the ash was extracted.

EXAMPLE VI

The procedure of Example I was followed, except that 8.63 g of 10 percent hydrazine was used. 78.1 percent of the ash was extracted.

EXAMPLE VII

The procedure of Example I was followed, except that 8.63 g of 5 percent hydrazine was used. 64.6 percent of the ash was extracted.

EXAMPLE VIII

In a flask equipped with heating mantle, magnetic stirrer, and dry ice condenser, 30 g washed ash, 285 g acetic acid, 15 g water and 10.95 g acetaldehyde were heated to reflux (98° C.) and kept at that temperature for two hours. The mixture was filtered, and the cake was washed with 150 g water and dried. 12.0 percent of the ash was extracted.

EXAMPLE IX

In a flask equipped with heating mantle, magnetic stirrer, and reflux condenser, 35 g washed ash, 332.5 g acetic acid, 17.5 g water, and 15.2 g formic acid were heated to 70° C. and kept at that temperature for two hours. The mixture was filtered, and the cake was washed with 175 g of 95 percent acetic acid and dried. Essentially none of the ash was extracted.

EXAMPLE X

In a flask equipped with heating mantle, magnetic stirrer, and reflux condenser, 40 g washed ash, 380 g acetic acid, and 20 g water were heated to 70° C. 80 g of 10 percent hydrogen peroxide in water was added over 30 minutes. The mixture was kept at 70° C. for an additional hour and filtered. The cake was washed with 200 g of water and dried. 13 percent of the ash was extracted.

EXAMPLE XI

In a flask equipped with heating mantle, magnetic stirrer, and reflux condenser, 40 g washed ash, 380 g acetic acid, and 20 g water were heated to reflux. 26.9 of 37 percent formaldehyde solution was added over 30 minutes. The mixture was kept at reflux temperature for an additional two hours and filtered. The cake was washed with 200 g of 95 percent acetic acid and dried. 18.0 percent of the ash was extracted.

EXAMPLE XII

The procedure of Example I was followed, except that the hydrazine solution was replaced by a solution of 30 g hydroxylamine hydrochloride in 130 g water. 95.0 percent of the ash was extracted.

EXAMPLE XIII

The procedure of Example I was followed, except that the hydrazine solution was replaced by a solution of 24.2 g hydroxylamine sulfate in 135.8 g water. 34.2 percent of the ash was extracted.

EXAMPLE XIV

In a flask equipped with heating mantle, magnetic stirrer, and reflux condenser, 26 g washed ash, 261 g acetic acid, 29 g water, and 16.6 g sodium formaldehyde sulfoxylate dihydrate were heated to 70° C. and kept at that temperature for two hours. The mixture was filtered, and the cake was washed with 260 g water and dried. 77.7 percent of the cake was extracted.

EXAMPLE XV

In a flask equipped with heating mantle, magnetic stirrer, and reflux condenser, 30 g washed ash, 285 g acetic acid, and 15 g water were heated to reflux (108° C.) and kept at that temperature for 1.5 hours. No reducing agent was used. The mixture was filtered, and the cake was washed with 150 g of 95 percent acetic acid and dried. 5.7 percent of the ash was extracted.

EXAMPLE XVI

In a flask equipped with heating mantle, magnetic stirrer, and reflux condenser, 26 g terephthalic acid (TA) fly ash (containing 11.9 percent cobalt and 65.0 percent manganese), 247 g acetic acid and 32 g water were heated to reflux. 8.63 g of 10 percent hydrazine was added over 30 minutes. The mixture was kept at reflux temperature for an additional two hours and filtered. The cake was washed with 260 g water and dried. 69.8 percent of the ash was extracted.

EXAMPLE XVII

A batch pseudocumene oxidation was performed with all of the cobalt and some of the manganese and zirconium replaced by an extract from Example I, as shown in Table I. During the oxidation, a tailout catalyst containing manganese, zirconium, and bromine was continually added. Composition of the tailout catalyst was: manganese 0.014 (wt) %, zirconium 0.006 (wt) %, and bromine 0.282 (wt) %. The reactor temperature was gradually increased from 320° F. to 410° F., and the pressure from 150 to 400 psig. Catalyst composition is shown in Table I. Results are given in Table II.

EXAMPLE XVIII

An oxidation was performed as in Example XVII with the above tailout catalyst but using an extract from Example V. The catalyst composition is shown in Table I, and the results in Table II.

EXAMPLE XIX

An oxidation was performed as in Example XVII with the above tailout catalyst but using an extract from Example VI. The catalyst composition is shown in Table I, and the results in Table II.

EXAMPLE XX

For comparison, an oxidation was performed as in Example XVII with the above tailout catalyst but using acetates of cobalt, manganese, and zirconium. The catalyst composition is shown in Table I, and the results in Table II.

EXAMPLE XXI

Run 131 shows that TMA fly ash by itself is almost insoluble in acetic acid at reflux temperature. Run 140 shows that the solubility of cobalt metal alone is also very limited. When TMA ash and cobalt metal are used together, however, the extraction is almost quantitative (Runs 141, 142, and 167). This result is especially surprising because of the limited solubility of both reactants. TA fly ash can also be extracted using this method (Run 166). Results are shown in Table III.

TABLE I

Catalyst Composition for Pseudocumene Oxidations
(Weight percent of pseudocumene)

| Oxidation Run No. | Source of Extract | Catalyst Type | Co | Mn | Zr | Br |
|---|---|---|---|---|---|---|
| Example XVII (9550-58) | Example I (9428-89) | Extract | .171 | .056 | .0025 | — |
|  |  | Virgin | — | — | .0015 | .061 |
|  |  | Total | .171 | .056 | .0040 | .061 |
| Example XVIII (9550-50) | Example V (9428-92) | Extract | .171 | .051 | .0021 | — |
|  |  | Virgin | — | — | .0019 | .061 |
|  |  | Total | .171 | .051 | .0040 | .061 |
| Example XIX (9550-51) | Example VI (9428-94) | Extract | .171 | .046 | .0019 | — |
|  |  | Virgin | — | .004 | .0021 | .061 |
|  |  | Total | .171 | .050 | .0040 | .061 |
| Example XX (9550-36) |  | Virgin | .171 | .050 | .0040 | .061 |

TABLE II

Results of Pseudocumene Oxidations

| Example No. | Run No. | Run Time min. | (a) PSC Burned Percent | TMLA(b) in Cake wt. percent |
|---|---|---|---|---|
| XVII | 9550-58 | 64 | 5.2 | 91.8 |
| XVIII | 9550-50 | 66 | 6.2 | 93.1 |
| XIX | 9550-51 | 65 | 6.1 | 91.1 |
| XX | 9550-36 | 64 | 5.1 | 90.6 |

(a) Pseudocumene (PSC)
(b) Trimellitic Acid (TMLA)

TABLE III

Fly Ash Extractions with Added Cobalt Metal

| Run No., 9428- | 131 | 140 | 141 | 142 | 166 | 167 |
|---|---|---|---|---|---|---|
|  |  | Controls |  |  |  |  |
| Feed, grams |  |  |  |  |  |  |
| TMA Fly Ash-9428-90-2 | 26.0 |  | 19.5 | 19.5 |  | 19.5 |
| TA Fly Ash-9428-86-1 |  |  |  |  | 19.5 |  |
| Co Metal-Added |  | 3.00 | 3.25 | 3.25 | 3.25 | 3.25 |
| Acetic Acid | 247 | 282 | 247 | 247 | 247 | 247 |
| Water | 39 | 15 | 13 | 13 | 13 | 13 |
| Extraction Efficiency, Wt. % of Solids Fed | 7.7 | 29.0 | 94.8 | 94.6 | 48.9 | 89.3 |

Note:
TMA fly ash (Sample No. 9428-90-2) contained 58.0% Co; 16.1% Mn; 2.29% Zr; 1.43% Fe. TA fly ash (Sample No. 9428-86-1) contained 11.9% Co; 65.0% Mn; 1.71% Fe. Ingredients were stirred under reflux for 2.5 hrs., filtered, and washed with water.

What is claimed is:

1. A process for the oxidation of di- or trimethylbenzenes with molecular oxygen under liquid-phase conditions in the presence of a recovered and recycled cobalt and manganese catalyst, which has been recovered by heating oxidation incinerator ash in the presence of acetic acid and a reducing agent wherein the weight ratio of acetic acid to said oxidation incinerator ash is from about 1:1 to about 50:1, and the ratio of electrons which the reducing agent can deliver to atoms of the cobalt plus manganese in the oxidation incinerator ash is from about 0.1:1 to about 4:1 at about the boiling point of the acetic acid at atmospheric pressure and recovering the cobalt and manganese in liquid solution as the metal acetic acid salt, wherein the oxidation is carried out at a temperature of from about 100° C. to about 250° C.

2. The process of claim 1 wherein the dimethyl benzene is para-xylene.

3. The process of claim 1 wherein the dimethyl benzene is meta-xylene.

4. The process of claim 1 wherein the trimethyl benzene is pseudocumene.

5. The process of claim 1 wherein the reducing agent is cobalt metal.

6. The process of claim 5 wherein the dimethyl benzene is para-xylene.

7. The process of claim 5 wherein the dimethyl benzene is meta-xylene.

8. The process of claim 5 wherein the trimethyl benzene is pseudocumene.

9. The process of claim 1 wherein the reducing agent is hydrazine.

10. The process of claim 9 wherein the dimethyl benzene is para-xylene.

11. The process of claim 9 wherein the dimethyl benzene is meta-xylene.

12. The process of claim 9 wherein the trimethyl benzene is pseudocumene.

13. The process of claim 1, wherein the weight ratio of acetic acid to said ash is in the range of about 2.5:1 to about 20:1.

14. The process of claim 5, wherein the ratio of gram-atoms of cobalt metal added to said ash to the gram-atoms cobalt plus manganese in said ash is in the range of about 0.05:1 to about 2:1.

15. The process of claim 9, wherein the ratio of moles of hydrazine added to said ash to the gram-toms of cobalt plus manganese in said ash is in the range of about 0.025:1 to about 1:1.

16. In an improved process for the oxidation of di-or trimethylbenzenes with molecular oxygen under liquid-phase conditions in the presence of a recovered and recycled cobalt and manganese catalyst at a temperature in the range of about 100° C. to about 250° C. wherein the catalyst is recovered by heating oxidation incinerator ash in the presence of acetic acid, the weight ratio of said acetic acid to said ash being in the range of about 1:1 to about 50:1, and recovering the cobalt and manganese in liquid solution, the improvement which comprises recovering said catalyst by heating said ash in the presence of said acetic acid and a reducing agent, the ratio of electrons which the reducing agent can deliver to atoms of the cobalt plus manganese in said ash being in the range of about 0.1:1 to about 4:1 at about the boiling point of the acetic acid at atmospheric pressure.

17. The process of claim 16, wherein said reducing agent is selected from the group consisting of cobalt metal and hydrazine.

18. The process of claim 16, wherein said ratio of electrons which the reducing agent can deliver to atoms of the cobalt plus manganese in said ash is in the range of about 0.2:1 to about 2:1 at about the boiling point of said acetic acid at atmospheric pressure.

19. The process of claim 17, wherein said ratio of electrons which the reducing gent can deliver to atoms of the cobalt plus manganese in said ash is in the range of about 0.2:1 to about 2:1 at about the boiling point of said acetic acid at atmospheric pressure.

* * * * *

UNITED STATES PATENT OFFICE
CERTIFICATE OF CORRECTION

Patent No. 4,876,386   Dated  Oct. 24, 1989

Inventor(s)  Juergen K. Holzhauer, Dennis J. Michalak & Wayne P. Schammel

It is certified that error appears in the above-identified patent and that said Letters Patent is hereby corrected as shown below:

| Col. | Line | |
|---|---|---|
| 4 | 5 | "liquidphase" should read -- liquid-phase-- |
| 10 | 63 | "gram-toms" should read --gram-atoms-- |
| 12 | 10 | "gent" should read --agent-- |

Signed and Sealed this

Ninth Day of October, 1990

Attest:

HARRY F. MANBECK, JR.

*Attesting Officer*   Commissioner of Patents and Trademarks